March 8, 1966 L. A. WILLS 3,239,098
SANITARY SIPPING-STRAW DISPENSER
Filed Nov. 7, 1963 2 Sheets-Sheet 1
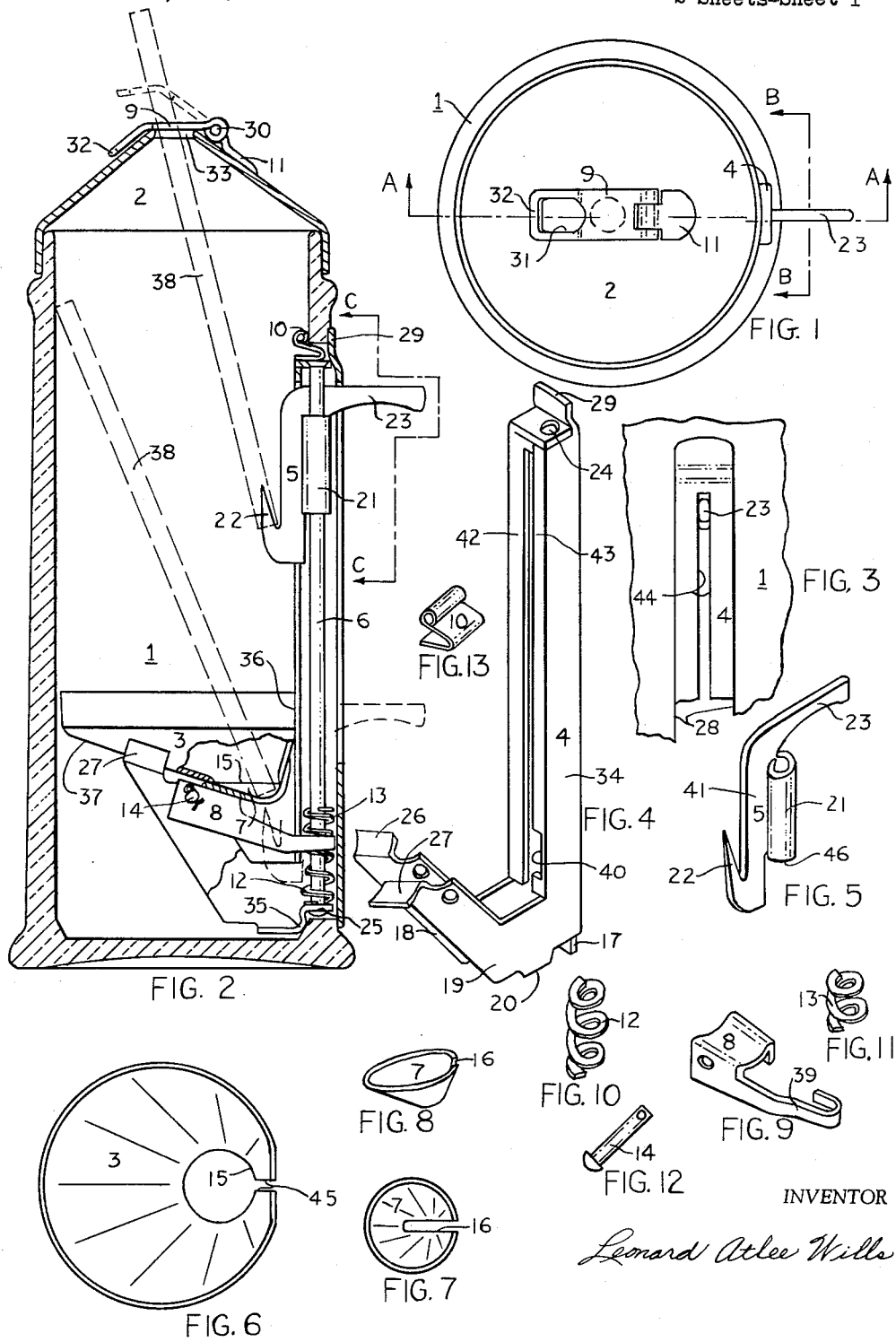
INVENTOR
Leonard Atlee Wills March 8, 1966 L. A. WILLS 3,239,098
SANITARY SIPPING-STRAW DISPENSER
Filed Nov. 7, 1963 2 Sheets-Sheet 2
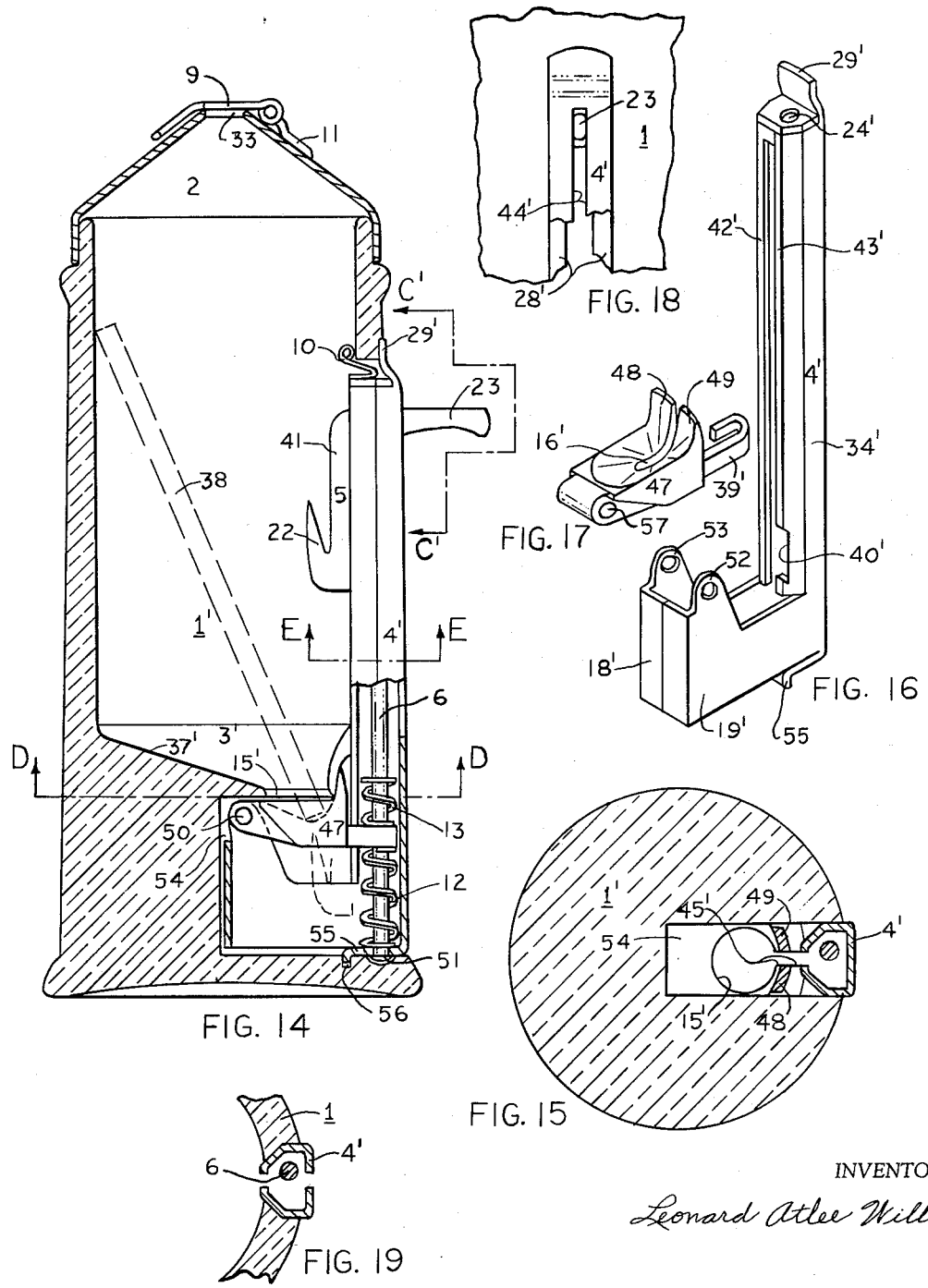
INVENTOR
Leonard Atlee Wills

United States Patent Office 3,239,098
Patented Mar. 8, 1966

3,239,098
SANITARY SIPPING-STRAW DISPENSER
Leonard Atlee Wills, Arlington County, Va. (P.O. Box 7354, Benjamin Franklin Station, Washington, D.C.)
Filed Nov. 7, 1963, Ser. No. 322,183
6 Claims. (Cl. 221—200)

This invention relates to straw dispensers, and more particularly to straw dispensers of the type having vertically reciprocable ejector means and wherein a straw supporting cup or wall is employed and straw shaking means are provided to facilitate the feeding and proper positioning of straws for delivery.

A main object of this invention is to provide a novel and improved sanitary soda-straw storing and dispensing device wherein the dispenser elements performing the functions of straw feeding, positioning, and agitation, effectively facilitate straw engagement and ejection while providing a durable, sturdy, inexpensive, and compact assembly which can withstand long and indiscriminate operation and handling without serious damage, wear, or fouling of its operation.

A further object of the invention is to provide a novel and improved sanitary soda-straw storing and dispensing device which is inexpensive to fabricate, relatively simple in construction, easy to assemble, which safely and adequately positions straws therein so that they will be reliably dispensed, which is compact in size, neat in appearance, effectively protected against contamination, easy to clean and replenish with straws, and which can be operated smoothly, effectively, and conveniently by the users.

Further objects and advantages of the invention will become apparent from the following description and claims, and from the accompanying drawings, wherein:

FIGURE 1 represents a top plan view of the improved soda straw dispenser.

FIGURE 2 represents a vertical central cross-sectional view of the improved soda straw dispenser constructed in accordance with the present invention, said view being taken substantially on the line A—A of FIGURE 1.

FIGURE 3 represents a fragmentary side elevation view of the device taken on line B—B of FIGURE 1 and line C—C of FIGURE 2.

FIGURE 4 represents a perspective view of a supporting frame.

FIGURE 5 represents a perspective view of a straw ejector member.

FIGURE 6 represents a top plan view of a straw supporting cup.

FIGURE 7 represents a top plan view of a straw contact member.

FIGURE 8 represents a perspective view of the straw contact member.

FIGURE 9 represents a perspective view of a straw agitator support-actuation lever.

FIGURE 10 represents a perspective view of a support-actuation lever cushioning spring.

FIGURE 11 represents a perspective view of an ejector impact absorber spring.

FIGURE 12 represents a perspective view of an agitator element pivot pin.

FIGURE 13 represents a perspective view of a supporting frame clamp spring.

FIGURE 14 represents a central vertical cross-sectional view of a modified form of the improved soda straw dispenser constructed in accordance with the present invention.

FIGURE 15 represents a horizontal cross-sectional view of the modified form of improved soda straw dispenser, said view being taken substantially on the line D—D of FIGURE 14.

FIGURE 16 represents a perspective view of a modified form of supporting frame.

FIGURE 17 represents a perspective view of a modified form of straw agitator element.

FIGURE 18 represents a fragmentary side elevation view of the modified form of dispenser taken essentially on line C'—C' of FIGURE 14.

FIGURE 19 represents a fragmentary horizontal cross-sectional view of the modified form of improved dispenser, said view being taken substantially on the line E—E of FIGURE 14.

A detailed description is given so that the construction, operation, and features of the invention may be clearly understood:

Referring to the drawings, and more particularly to FIGURE 2, a soda straw dispenser is designated of the type where straws stand on end in a straw receptacle having a bottom and side walls and a straw dispensing mechanism is employed to dispense straws into a straw dispensing aperture in the receptacle cover lid, for example, of the general type disclosed in U.S. Patent No. Re. 24,950 to Leonard A. Wills.

A cylindrical plastic, metal or glass jar 1 of proper size and shape is employed for the straw receptacle. The jar 1 is provided with a cover lid 2 which is generally upwardly funnel shaped. Cover lid 2 is provided with a straw dispensing aperture at 33. The straw dispensing aperture 33 is provided with a closure and straw retention member 9 pivotally hinged to bracked 11 by pivot pin 30. The extended length 32 of closure member 9 increases the closing moment of member 9. Opening 31 in member 9 permits the passage of a straw therethrough after member 9 has been moved to the open position by a straw. The delivered straw is retained in the delivered position by the retention member 9 pressing it against the dispensing aperture edge 33.

Designated at 4 is a supporting frame (individual view is shown in FIGURE 4) comprising a straight vertical side portion 34, and two prongs 18 and 19 extending from the bottom of the vertical side portion 34. The vertical side portion 34 of supporting frame 4 is positioned in opening 28 formed in the vertical side wall of jar 1. Tabs 17, 20, and 35 formed at the bottom end of supporting frame 4 contacts jar 1 near the bottom end of said opening 28 and supports the weight of the supporting frame. Tab 29 formed at the top end of supporting frame 4 provides horizontal support for the top end of the supporting frame 4 against the exterior sidewall of jar 1. Clamp spring 10 (individual view in FIGURE 13) attached at the top end of frame 4 provides horizontal support for the top end of the supporting frame 4 against the interior sidewall of jar 1, and may be depressed to release the top end of supporting frame 4 for movement outwardly through opening 28 in jar 1.

A straw supporting cup 3 is located within jar 1 and is attached to prongs 18 and 19 of supporting frame 4 by tabs 26 and 27, respectively, and to the vertical side portion 34 at 36 for support (individual top view of cup 3 is shown in FIGURE 6). Cup 3 is formed with a downwardly funnel shaped bottom wall having an upper article funneling surface 37 which generally slopes downwardly toward the side of the cup adjacent the vertical side portion 34 and has an opening 15 at the bottom-most portion thereof. A slot 45 joins opening 15 with the periphery of the cup 3.

A straw agitator element comprised of straw contact member 7 and support-actuation lever 8 is provided. The straw contact member 7 (individual views shown in FIGURES 7 and 8) is positioned adjacent to cup 3 at opening 15. The top surface of member 7 is downwardly funnel shaped. A narrow slot or opening 16 is formed in member 7 and passes through the bottom-most portion of the funnel shaped surface. The slot 16 underlies the bottom-most ends of a plurality of inclined soda straws 38 disposed on the contact member 7 as shown. The contact member 7 is mounted on a support-actuation lever 8 (individual view shown in FIGURE 9). Lever 8 is pivotally mounted by pivot pin 14 (individual view is shown in FIGURE 12) to prongs 18 and 19 of supporting frame 4. Lever 8 is formed with an arm 39 which is movably received in notch 40 of the vertical side portion 34.

An ejector member 5 (individual view is shown in FIGURE 5) is largely contained within the vertical side portion 34 and is slidably mounted on a vertical cylindrical rod 6 being supported at hole 24 at the top end, and at joint 25 of tab 35 at the bottom end of vertical side portion 34. Flange 41 of the ejector member 5 is slidable vertically between flanges 42 and 43 (see FIGURE 4) of the vertical side portion 34, and lift arm 23 of ejector member 5 is slidable vertically in slot 44 formed in the vertical side portion 34 (see FIGURE 3). Straw engagement pin 22 is formed on ejector member 5 and is positioned in vertical registry with slot 16 in contact member 7 and slot 45 in supporting cup 3, said pin element being movable vertically through said slots responsive to the elevation of ejector member 5, whereby to engage in the bottom end of a straw, as will be presently described. A coil cushioning spring 12 (individual view is shown in FIGURE 10) is positioned on the lower end of rod 6, and supports the agitator support-actuation lever 8 and biases it upwardly such that arm portion 39 normally rests against the upper edge of notch 40 formed in the vertical side portion 34. An ejector impact spring 13 (individual view is shown in FIGURE 11 is located and slidable on rod 6, and rests on arm 39 of the support-actuation lever 8. The lower end 46 of sleeve 21 of ejector member 5 overlies the impact spring 13 and is engageable therewith to deliver an impact thereto when the ejector member 5 descends, whereby to deliver a force tending to rotate the support-actuation lever 8 and contact member 7 clockwise around the pivot pin, depressing the cushioning spring 12 slightly (as viewed in FIGURE 2). Lift arm 23 is formed on ejector member 5 to permit elevation of the ejector member by the user of the dispenser.

Operation of the dispenser is described as follows:

When the lift arm 23 of ejector member 5 is released from an elevated position, the straw engagement pin 22 moves downwardly through slot or opening 16 in contact member 7 and slot 45 in cup 3. The bottom end 46 of sleeve 21 of ejector member 5 contacts ejector impact spring 13. The abrupt impact is largely absorbed by impact spring 13 and the spring 12. Cushioning spring 12 becomes partly deflected. The agitator support-actuation lever 8 and contact member 7 (mounted thereon) are jarred and rotate slightly in a clockwise direction as viewed in FIGURE 2. Said jarring and rotation of member 7 and lever 8 provide a beneficial agitation to straws being supported on the contact member 7, which facilitates the movement of the bottom ends of said straws over the slotted area 16. Straws rest essentially in an inclined position within the straw receptacle because the funnel shaped bottom wall surface 37 of straw supporting cup 3 generally slopes downwardly toward the side of the cup adjacent the vertical side portion 34. Being inclined as described, the straws tend to align themselves parallel to each other which facilitates movement of the bottom ends of the straws to the slot 16 for engagement by the straw engagement pin 22. Also, the bottom ends of the straws end to move closely together, and the openings in the bottom ends of the straws are facing essentially the same direction (perpendicular to the pin) and presenting optimum opening areas for pin engagement. Jarring or agitation of the straws insures that they will not hang up or fail to move over the said slot for engagement. When the lift arm 23 is lifted by the user, the engagement pin 22 moves upwardly through the slot 16 and engages the bottom end of a straw. The engaged straw is elevated to a position that permits a portion of the straw to pass through the discharge opening 33 in cover lid 9 for withdrawal by hand. The delivered straw can be retained in the delivered position by the closure-straw retention member 9 pressing it against the dispensing aperture edge 33, should the lift arm 23 be released before the straw is withdrawn from the receptacle. The ejector 5 of course normally rests at the downward position; it is shown in the upward position in FIGURE 2 to permit more detail of the assembly to be shown. The above described cycle is repeated for the delivery of each straw. Regular, jumbo, or other size straws can be dispensed with this device.

The assembly comprising the supporting frame 4, straw supporting cup 3 and all other parts assembled therewith these parts is removable from the jar 1 as a straw dispenser attachment. The attachment assembly is removed as follows: Clamp spring 10 is depressed, and the top end of supporting frame 4 is pushed outwardly through slot 28 in jar 1. The attachment is rotated clockwise (as viewed in FIGURE 2) permitting its bottom end to be lifted from the receptacle first. The attachment is replaced in jar 1 in the reverse order of the procedure described.

Referring now to FIGURE 14, a modified form of soda straw dispenser is designated of the same general type as shown in FIGURE 2, but having a straw receptacle with bottom and side walls of modified form, supporting frame, and straw agitator element.

The modified form of straw receptacle jar 1' is of plastic or glass material or such of proper size and shape. The jar 1' is provided with cover lid 2. The straw dispensing aperture 33 is provided with closure and straw retention member 9 pivotally hinged to bracket 11.

Designated at 4' is the modified form of straw supporting frame (individual view is shown in FIGURE 16) comprising a straight vertical side portion 34', and two horizontal portions 18' and 19' extending from the bottom portion of the vertical side portion 34'. The vertical side portion 34' of supporting frame 4' is positioned in opening 28' formed in the vertical side wall of jar 1'. The two horizontal portions 18' and 19' are positioned in cavity 54 of jar 1'. The end of tab 55 formed at the bottom end of supporting member 4' is received in groove 56 of jar 1' to retain the bottom end of supporting member 4' in cavity 54 of jar 1'. Tab 29' formed at the top end of supporting frame 4' provides horizontal support for the top end of the supporting frame 4' against the exterior sidewall of jar 1'. Clamp spring 10 attached at the top end of supporting frame 4' provides horizontal support for the top end of the supporting frame 4' against the interior sidewall of jar 1', and may be depressed to release the top end of supporting frame 4' for movement outwardly through opening 28' in jar 1'.

A straw supporting cup 3' is integrally formed within jar 1'. Cup 3' is formed with a bottom wall having an upper article funneling surface 37' which generally slopes downwardly toward the side of the cup near the vertical side portion 34' and has an opening 15' at the bottom-most portion thereof. A slot 45' (as seen in FIGURE 15) joins opening 15' with the periphery of the cup 3'.

A straw agitator element 47 is provided (individual view is shown in FIGURE 17) adjacent to opening 15' of cup 3'. The top surface of element 47 is downwardly funnel shaped. A narrow slot or opening 16' is formed therein said element 47 and passes through the bottom-most portion of the funnel shaped surface. The slot 16' underlies the bottom-most ends of a plurality of inclined soda straws 38 disposed on element 47 as shown. Prongs 48 and 49 are formed on agitator element 47 to provide an extension to the funnel shaped surface of member 47 which prevents straws from slipping off of member 47 when same is rotated downwardly. Straw agitator element 47 is pivotally mounted on horizontal portions 18' and 19' by pivotal pin 50 engaging hole 57 in element 47 and lugs 53 and 52 of said horizontal portions respectively. Element 47 is formed with arm 39' which is movably received in notch 40' of the vertical side portion 34'.

The ejector member 5, rod 6, cushioning spring 12, and the impact spring 13, is utilized in the modified form of straw dispenser. The ejector member is largely contained within the vertical side portion 34' and is vertically and slidably mounted therein on cylindrical rod 6 which is supported at hole 24' at the top of frame 4' and at joint 51 at the bottom of frame 4'. Flange 41 of member 5 is slidable vertically between flanges 42' tnd 43' (see FIGURE 4) of the vertical side portion 34'. Straw engagement pin 22 is positioned in vertical registry with slot 16' in straw agitator element 47 and slot 45' in supporting cup 3', said pin element being movable vertically through said slots responsive to the elevation of ejector member 5, whereby to engage in the bottom end of a straw, as will be presently described. The coil cushioning spring 12 is positioned on the lower end of rod 6, and supports arm 39' of agitator element 47 and biases it upwardly such that arm portion 39' normally rests against the upper edge of notch 40' formed in the vertical side portion 34'. The ejector impact spring 13 is located and slidable on rod 6, and rests on arm 39' of the agitator element 47. The lower end 46 of sleeve 21 of ejector member 5 (see FIGURE 5) overlies impact spring 13 and is engageable therewith to deliver an impact thereto when the ejector member 5 descends, whereby to deliver a force tending to rotate agitator element 47 clockwise, slightly depressing the cushioning spring 12, as viewed in FIGURE 14. Lift arm 23 extends through and is movable vertically therein slot 44' (see FIGURE 18) formed in the supporting frame 4'.

Operation of the modified form of dispenser is described as follows:

When the lift arm 23 of ejector member 5 is released from an elevated position, the straw engagement pin 22 moves downwardly through slots 16' in agitator element 47 and slot 45' in cup 3'. The bottom end 46 of sleeve 21 of ejector member 5 contacts ejector impact spring 13. The abrupt impact is largely absorbed by impact spring 13 and the cushioning spring 12. Cushioning spring 12 is partially deflected. The agitator element 47 is jarred and rotates slightly in a clockwise direction as viewed in FIGURE 14. Said jarring and ortation of member 47 provides a beneficial agitation to straws being supported on the element 47, which facilitates movement of the bottom ends of said straws over the slotted area 16'. Straws rest essentially in an inclined position within the straw receptacle because the funnel shaped bottom wall surface 37' of cup 3' generally slopes downwardly toward the side of the cup adjacent the vertical side portion 34'. Being inclined as described, the straws tend to align themselves parallel to each other which facilitates movement of the bottom ends of said straws to the slot 16' for engagement by the straw engagement pin 22. Also, the bottom ends of the straws tend to move closely together, and the openings in the bottom ends of the straws are facing essentially the same direction (perpendicular to the pin 22) and presenting optimum opening areas for pin engagement. Jarring or agitation of the straws insures that they will not hang up or fail to move over said slot for engagement. When the lift arm 23 is lifted by the user, the engagement pin 22 moves upwardly through the slot 16' and engages the bottom end of a straw. The engaged straw is elevated to a position that permits a portion of the straw to pass through the dispensing aperture 33 in cover lid 9 for withdrawal by hand. The delivered straw can be retained in the delivered position by the closure-straw retention member 9 pressing it against the edge of the dispensing aperture 33, should the lift arm 23 be released before the straw is withdrawn from the receptacle. The ejector 5 of course normally rests at the downward position.

The assembly comprising the supporting frame 4', straw agitator element 47, ejector member 5, rod 6, spring 12, spring 13, and clamp spring 10, is removable from the jar 1' as a straw dispenser attachment. The attachment is removed from jar 1' by depressing clamp spring 10 and lifting the attachment upwardly until the end of tab 55 clears groove 56 in jar 1', then pushing the attachment horizontally from jar 1'. The attachment is replaced in jar 1' in the reverse order of that described.

Advantages of the straw agitator elements are described above:

As it is the nature of straws to fail to slide occasionally when resting on a funnel-shaped smooth surface under static forces of their own weights, and as they tend to hang together, cross over each other, and stand each other away from the straw engagement area, agitation is often necessary to get them moving again. Paper straws have fuzz on their ends as seen when viewed closely which inhibits their movements. They are relatively soft and relatively easily bent or crushed; therefore, these characteristics must be taken into consideration when dispensing same. Agitation of straws prior to each engagement is preferable to insure that they are in proper positions before each ejector elevation.

Straw agitation is localized to those straws in the vicinity of the engagement slot area, which are those straws standing on and in contact with the straw contact member. (There is no need to agitate the other straws which are standing on the straw supporting cup, because their movement over the engagement slot is blocked by those straws closer to the slot.) A longitudinal jolting or jarring type of straw agitation is provided. This type of straw agitation is effective in getting the straws to shift positions of their bottom ends on the contact member, and facilitates movement of their bottom ends over the straw engagement slot area for engagement. This localized straw agitation avoids abuse of other straws standing on the straw supporting cup. The agitation occurs after the engagement pin has passed down through the slot and immediately before each straw engagement attempt. The straw agitator element can be small in size and light in weight and still perform its function properly, as it is located adjacent the ejector and at the straw engagement area. This avoids having to actuate a relative large and heavy member such as when the entire straw supporting cup is shaken for straw agitation. The wear and tear on the device of large moving parts is avoided, and adequate means is provided at less cost. The straw agitation elements described permits the use of a fixed straw supporting cup, making a more sturdy and durable assembly, and avoids the possibility of a straw being wedged between the interior receptacle sidewall and a moving cup which fouls the operation of the device as the cup cannot be shaken properly to agitate the straws.

As an arm of the straw agitator member is supported on a cushioning spring with an impact absorber spring resting on and above the arm, a unique arrangement is provided whereby abrupt ejector impact shocks are largely absorbed, beneficial straw agitator actuation is provided, and at the same time a smoothly functioning device is created; minimizing wear and tear while permitting the use of an inexpensive type of drop ejector (the user lets the ejector member fall from the elevated position to the bottom position) which does not require the use of expensive ejector return springs or other relative expensive types of ejector actuation mechanisms.

The straw attachment assembly described above permits the use of an inexpensive plastic or glass receptacle while locating the lift lever at a position convenient to the user, permits easy disassembly for cleaning purposes, and permits a simple and compact structure with few parts, but effectively provides all necessary functions such as straw agitation, straw positioning, straw engagement and ejection, ejector shock absorption, and sanitary straw storage. Such an attachment assembly assembly also permits the use of a molded straw receptacle having the straw supporting cup integrally molded therewith.

While certain specific embodiments of soda straw dispensers have been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A straw dispenser comprising a straw receptacle having a top wall, a bottom wall, and side wall, a dispensing aperture in said top wall, the bottom wall being adapted to support the bottom ends of straws, a straw ejector, a straw agitator, said bottom wall having an upper article funneling surface and an opening in the funneling surface, said funneling surface adapted to permit the bottom ends of straws to flow to said opening by gravity, means for mounting said ejector on said receptacle for vertical reciprocation from a lower position to an upper position and during movement from the lower position to pass through said opening in the funneling surface, said opening being offset from the vertical central axis of the receptacle, said ejector adapted to engage the bottom end of a straw and elevate the straw, said agitator having first and second portions and being movably mounted on said receptacle, said agitator first portion having an upper surface adapted to support the bottom ends of straws, said agitator positioned so that said agitator first portion upper surface supports the bottom ends of straws standing in said funneling surface opening, said agitator first portion being movable so that said upper surface is retractable relative to said funneling surface opening to agitate the straws, said ejector and said agitator being positioned with respect to each other and adapted so that when said ejector moves from its upper position to its lower position said ejector engages and actuates the second portion of said agitator thereby retracting the agitator first portion upper surface relative to the funneling surface opening to agitate the straws to facilitate movement of the bottom end of a straw into the path of said ejector whereby the raising of said ejector through the funneling surface opening may engage and elevate a straw into said dispensing aperture.

2. A straw dispenser comprising a straw receptacle having a top wall, a bottom wall, and side wall, a dispensing aperture in said top wall, the bottom wall being adapted to support the bottom ends of straws, a straw ejector, a straw agitator, said bottom wall having an upper article funneling surface and an opening in the funneling surface, said funneling surface adapted to permit the bottom ends of straws to flow to said opening by gravity, said agitator having first and second portions and being movably mounted on said receptacle, said agitator first portion having an upper surface adapted to support the bottom ends of straws with a narrow slot therein over which the bottom ends of straws may position, said agitator positioned so that said agitator first portion upper surface supports the bottom ends of straws standing in said funneling surface opening, said funneling surface opening being offset from the vertical central axis of the receptacle, said agitator first portion being movable so that said upper surface is retractable relative to said funneling surface opening to agitate the straws, means for mounting said ejector on said receptacle for vertical reciprocation from a lower position to an upper position and during movement from the lower position to pass through said narrow slot of said agitator first portion upper surface and the receptacle bottom wall funneling surface opening, said ejector adapted to engage the bottom end of a straw and elevate the straw, said ejector and said agitator being positioned with respect to each other and adapted so that when said ejector moves from its upper position to its lower position said ejector engages and actuates the second portion of said agitator thereby retracting the agitator first portion upper surface relative to the funneling surface opening to agitate the straws to facilitate movement of the bottom end of a straw over said narrow slot into the path of said ejector whereby the raising of said ejector through the said agitator first portion upper surface narrow slot may engage and elevate a straw into said dispensing aperture.

3. A straw dispenser as set forth in claim 1 further characterized in that said agitator first portion upper surface is retracted in a downwardly direction relative to said funneling surface opening during said agitator actuation.

4. A straw dispenser as set forth in claim 2 further characterized in that said agitator first portion upper surface is retracted in a downwardly direction relative to said funneling surface opening during agitator actuation.

5. A straw dispenser as set forth in claim 1 wherein said agitator has a pivotal motion upon a substantially horizontal axis below said funneling surface.

6. A straw dispenser as set forth in claim 2 wherein said agitator has pivotal motion upon a substantially horizontal axis below said funneling surface.

References Cited by the Examiner

UNITED STATES PATENTS

| | | | |
|---|---|---|---|
| Re. 24,950 | 3/1961 | Wills | 221—192 |
| 1,276,338 | 8/1918 | Eisenhardt | 221—224 |
| 1,589,891 | 6/1926 | Mazzoni et al. | 221—250 |
| 1,959,957 | 5/1934 | Kaparin et al. | 221—200 |
| 2,165,998 | 7/1939 | De Silvestro | 221—205 |
| 2,251,489 | 8/1941 | Koziel | 221—254 |
| 2,873,047 | 2/1959 | Cepero | 221—254 |

LOUIS J. DEMBO, *Primary Examiner.*

RAPHAEL M. LUPO, *Examiner.*